(12) United States Patent
Galbraith et al.

(10) Patent No.: US 10,261,907 B2
(45) Date of Patent: Apr. 16, 2019

(54) CACHING DATA IN A REDUNDANT ARRAY OF INDEPENDENT DISKS (RAID) STORAGE SYSTEM

(71) Applicant: International Business Machines Corporation, Armonk, NY (US)

(72) Inventors: Robert Galbraith, Rochester, MN (US); Adrian C. Gerhard, Rochester, MN (US); Daniel F. Moertl, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 15/454,389

(22) Filed: Mar. 9, 2017

(65) Prior Publication Data

US 2018/0260328 A1 Sep. 13, 2018

(51) Int. Cl.
*G06F 12/08* (2016.01)
*G06F 12/0868* (2016.01)
(Continued)

(52) U.S. Cl.
CPC ...... *G06F 12/0868* (2013.01); *G06F 12/0871* (2013.01); *G06F 12/0873* (2013.01); *G06F 12/0875* (2013.01); *G06F 2212/1016* (2013.01); *G06F 2212/262* (2013.01); *G06F 2212/281* (2013.01); *G06F 2212/305* (2013.01); *G06F 2212/3042* (2013.01); *G06F 2212/313* (2013.01); *G06F 2212/452* (2013.01); *G06F 2212/604* (2013.01)

(58) Field of Classification Search
CPC ............. G06F 12/0868; G06F 12/0871; G06F 12/0873; G06F 12/0875; G06F 2212/452; G06F 2212/604; G06F 2212/1016; G06F 2212/305; G06F 2212/262; G06F 2212/281; G06F 2212/3042; G06F 2212/313
USPC ........................................................ 711/125
See application file for complete search history.

(56) References Cited

U.S. PATENT DOCUMENTS 7,035,974 B2 4/2006 Shang
8,285,931 B2 10/2012 Ledford
(Continued)

OTHER PUBLICATIONS

U.S. Appl. No. 15/817,823, to Robert Galbraith, et al., entitled, *Caching Data in a Redundant Array of Independent Disks (RAID) Storage System*, assigned to International Business Machines Corporation, 30 pages, filed Nov. 20, 2017.
(Continued)

*Primary Examiner* — Hua J Song
(74) *Attorney, Agent, or Firm* — Nathan Rau

(57) ABSTRACT

Caching data in a redundant array of independent disks (RAID) storage system including receiving an operation instruction targeting a location in an attached memory of the RAID storage system, wherein the attached memory temporarily stores data for storage on RAID storage devices, and wherein the operation instruction is one selected from a group consisting of a read instruction and a write instruction; redirecting, based on a content of the operation instruction, the operation instruction from the attached memory to the embedded memory on the RAID storage system; and servicing the operation instruction by accessing a portion of the embedded memory corresponding to the location in the attached memory of the RAID storage system.

13 Claims, 6 Drawing Sheets

(51) Int. Cl.
G06F 12/0875 (2016.01)
G06F 12/0873 (2016.01)
G06F 12/0871 (2016.01)

(56) References Cited

U.S. PATENT DOCUMENTS

| | | |
|---|---|---|
| 9,229,870 B1 * | 1/2016 | Kumar ................ G06F 12/0868 |
| 2010/0017556 A1 | 1/2010 | Chin et al. |
| 2010/0017650 A1 | 1/2010 | Chin et al. |
| 2015/0058576 A1 * | 2/2015 | Galbraith ............ G06F 12/0886 |
| | | 711/133 |

OTHER PUBLICATIONS

Appendix P; List of IBM Patent or Applications Treated as Related, Nov. 14, 2017, 2 pages.

Hewlett Packard Enterprise, *HP Smart Array Controller technology*, Technical White Paper, Aug. 2014, 16 pages, Hewlett-Packard Development Company, L.P. (online, hpe.com), URL: www.hpe.com/h20195/v2/getpdf.aspx/4AA5-4124ENW.pdf.

* cited by examiner

CACHING DATA IN A REDUNDANT ARRAY OF INDEPENDENT DISKS (RAID) STORAGE SYSTEM

BACKGROUND

Field of the Invention

The field of the invention is data processing, or, more specifically, methods, apparatus, and products for caching data in a redundant array of independent disks (RAID) storage system.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for caching data in a redundant array of independent disks (RAID) storage system. Caching data in a RAID storage system includes receiving an operation instruction targeting a location in an attached memory of the RAID storage system, wherein the attached memory temporarily stores data for storage on RAID storage devices, and wherein the operation instruction is one selected from a group consisting of a read instruction and a write instruction; redirecting, based on a content of the operation instruction, the operation instruction from the attached memory to the embedded memory on the RAID storage system; and servicing the operation instruction by accessing a portion of the embedded memory corresponding to the location in the attached memory of the RAID storage system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
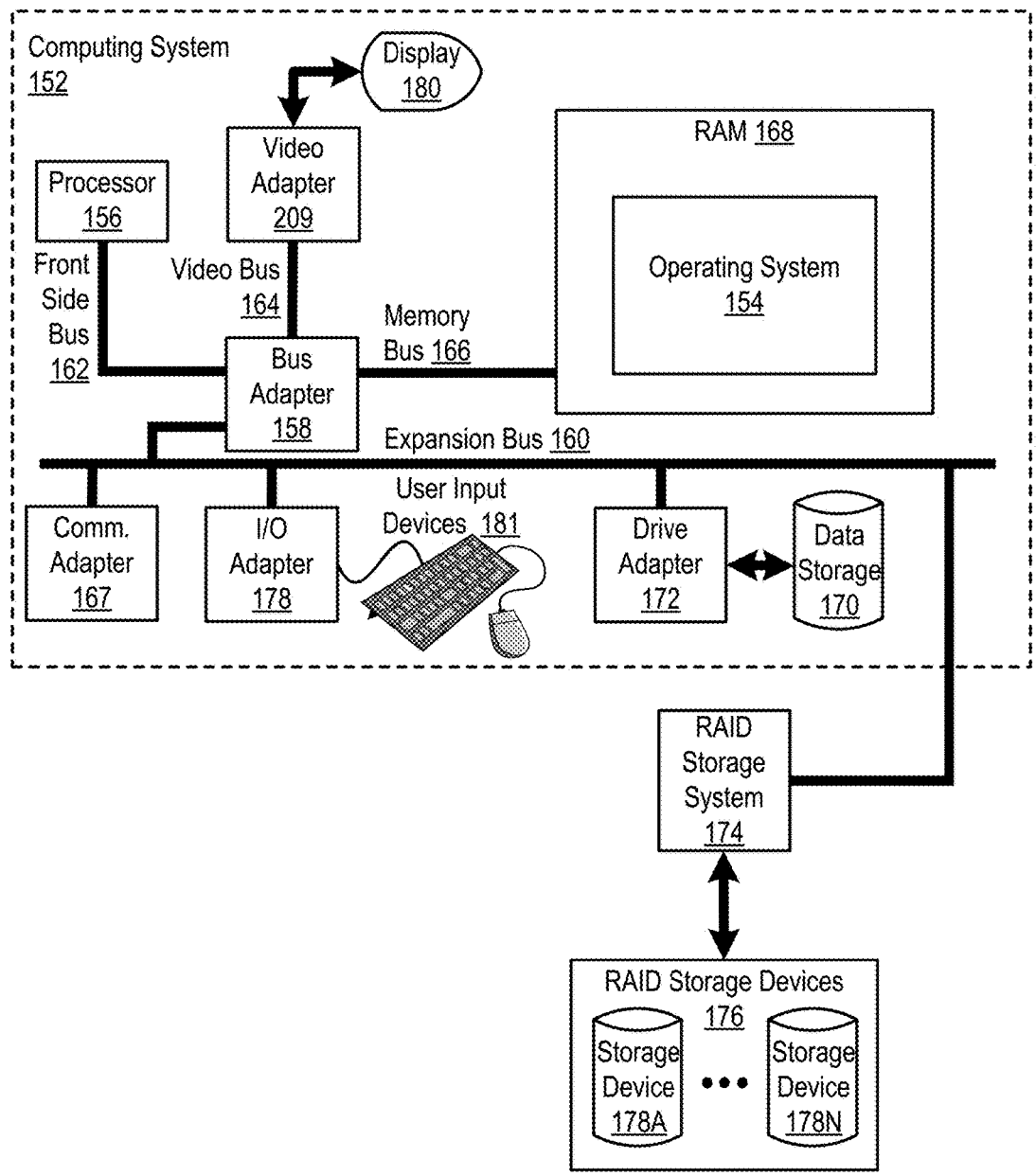
FIG. 1 sets forth a block diagram of an example system configured for caching data in a redundant array of independent disks (RAID) storage system according to embodiments of the present invention.

Exemplary methods, apparatus, and products for caching data in a redundant array of independent disks (RAID) storage system in accordance with the present invention are described with reference to the accompanying drawings, beginning with FIG. 1. FIG. 1 sets forth a block diagram of automated computing machinery comprising an exemplary computing system (152) configured for caching data in a RAID storage system according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

Stored in RAM (168) is an operating system (154). Operating systems useful in computers configured for caching data in a RAID storage system according to embodiments of the present invention include UNIX™, Linux, Microsoft XP™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for caching data in a RAID storage system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for caching data in a RAID storage system according to embodiments of the present invention include modems for wired dial-up communications, Ethernet (IEEE 802.3) adapters for wired data communications, and 802.11 adapters for wireless data communications.

The exemplary computing system (152) of FIG. 1 also includes a RAID storage system (174) coupled to RAID storage devices (176), which include multiple storage devices (storage device (178A), storage device (178N)).

Figure 2:
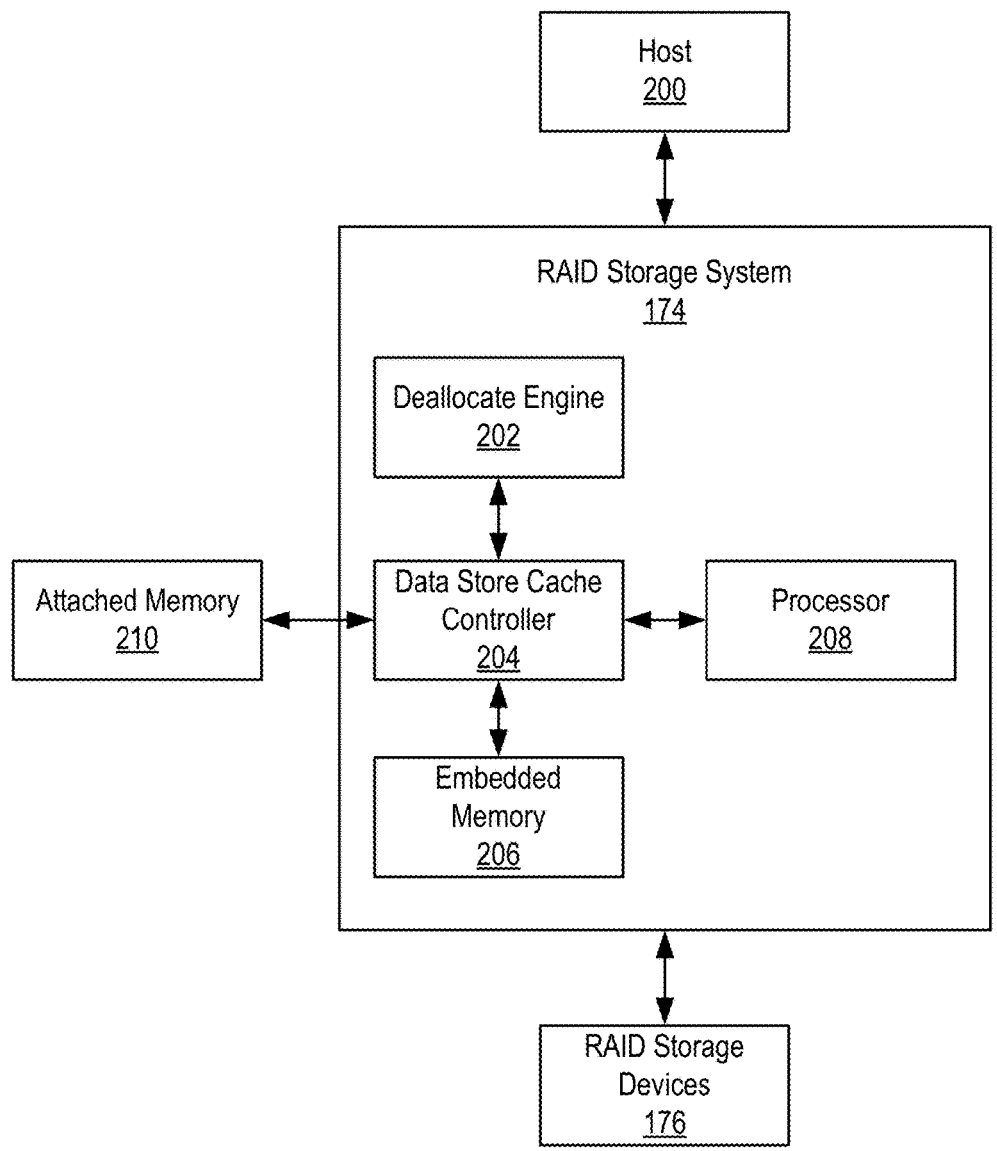
FIG. 2 sets forth a block diagram of an example system configured for caching data in a RAID storage system according to embodiments of the present invention.

For further explanation, FIG. 2 sets forth a block diagram for caching data in a RAID storage system according to embodiments of the present invention. As shown in FIG. 2, FIG. 2 includes a host (200) coupled to a RAID storage system (174). The RAID storage system (174) is coupled to RAID storage devices (176) and the attached memory (210). The RAID storage system (174) includes a deallocate engine (202), a data store cache controller (204), embedded memory (206), and a processor (208).

The host (200) is a computing system configured to transfer data to the RAID storage system (174) for storage on the RAID storage devices (176). The host (200) may be a computing system as shown in FIG. 1. The host (200) may be a virtual machine executing within a computing system. Further, host (200) may be representative of multiple host computing systems attached to the RAID storage system though a communications fabric such as a peripheral component interconnect.

The RAID storage system (174) is a collection of components used to manage data storage to, and data access from, the RAID storage devices (176). The RAID storage system (174) receives data from the host (200) and stores the data on the RAID storage devices (176). The RAID storage system (174) also receives requests for data from the host (200) and retrieves the data from the RAID storage devices (176). The RAID storage system (174) may include elements not shown in FIG. 2.

The RAID storage system (174) may include an application specific integrated circuit (ASIC) upon which some or all of the components are implemented, such as the deallocate engine (202), the data store cache controller (204), the embedded memory (206), and the processor (208). The deallocate engine (202), the data store cache controller (204), the embedded memory (206), and/or the processor (208) may be formed as circuits within the same die.

The attached memory (210) may be random access memory, such as dynamic random access memory (DRAM). The attached memory (210) may be a memory chip attached to the RAID storage system (174) via chip pins. The attached memory (210) may include portions of memory for use as buffers for writing data to the RAID storage devices (176). For example, the attached memory (210) may include a nonvolatile cache buffer used to temporarily store data from the host (200) before writing the data to the RAID storage devices (176). The attached memory (210) may also include a first volatile buffer and a second volatile buffer used to store the decompressed version of the data from the nonvolatile cache buffer and to store parity blocks calculated from the decompressed data.

The processor (208) is an element or group of elements configured to execute processes for storing data to the RAID storage devices (176) and reading data from the RAID storage devices (176). The processor (208) may also be configured to interpret communications between the RAID storage system (174) and the host (200).

The data store cache controller (204) is an element or group of elements that determines whether to redirect operation instructions (e.g., read and write requests) from the attached memory (210) to the embedded memory (206). The data store cache controller (204) may include a start address and an end address register to detect which indexes are redirected to the embedded memory (206). For a read operation instruction, the data store cache controller (204) may determine whether the operation instruction targets a volatile address (i.e., an address within the first volatile buffer or the second volatile buffer). The data store cache controller (204) may then determine whether the targeted address is in range of addresses to be redirected. The data store cache controller (204) may then determine whether the corresponding cache line in the embedded memory (206) is valid. Finally, the data store cache controller (204) may determine whether the subblock of the cacheline is also valid. If the subblock is valid, the data store cache controller (204) reads the data from the embedded memory (206). Otherwise, the read operation instruction is serviced by the attached memory (210).

For a write operation instruction, the data store cache controller (204) may determine whether the operation instruction targets a volatile address and whether the targeted address is in range of addresses to be redirected. The data store cache controller (204) may then determine whether the corresponding cache line in the embedded memory (206) is valid. If not, the data store cache controller (204) may determine if an empty cacheline exists in the embedded memory (206). If there is an empty cacheline in the embedded memory (206), that cacheline is marked active and the data is written to the subblock in the embedded memory. Otherwise, the write operation instruction is serviced by the attached memory (210).

The embedded memory (206) is memory embedded on the die with other elements of the RAID storage system (174), such as the deallocate engine (202), the data store cache controller (204), and the processor (208). The embedded memory may have significantly faster access times compared to the attached memory. The embedded memory (206) may include embedded DRAM (eDRAM). The embedded memory (206) may not cast out to an external data store, such as the attached memory (210) or may not load from the external data store. Instead, pages in the embedded memory may be invalidated by the deallocate engine (202). Further, the embedded memory (206) may be populated using redirected write instructions instead of load operations that may be typical in high-level cache memory systems.

An example embedded memory (206) may be an 8 megabyte memory with 4 kilobyte cachelines and 256 entries. Each subblock would be 512 or 528 bytes. Each 4 kilobyte index would point to 4096 byte or 4224 byte volatile buffer entry in the attached memory (210). Each 4 kilobyte cacheline would include a valid bit.

The deallocate engine (202) is an element or group of elements configured to allocate and deallocate the embedded memory (206). Embedded memory utilizing a least recently used cast out process may prematurely cast out data from the embedded memory before the data stripe and parity have been calculated and written to the RAID storage devices (176). The deallocate engine (202) may replace a high-level cache cast out mechanism.

Once a RAID stripe of data has been written to the RAID storage device (176) and the data typically stored in the first volatile buffer and the second volatile buffer is no longer needed, the deallocate engine (202) sends, to the data store cache controller (204), the address of the data to be removed. Once the data store cache controller (204) verifies that the address targets a volatile address, that the address is in range of the address that are redirected, and that the targeted cacheline is valid, the data store cache controller (204) removes the cacheline data from the embedded memory (206). The deallocate engine (202) may also include a sis send engine that sends a group of pinned addresses to the data store cache controller (204) for removal.

Figure 3:
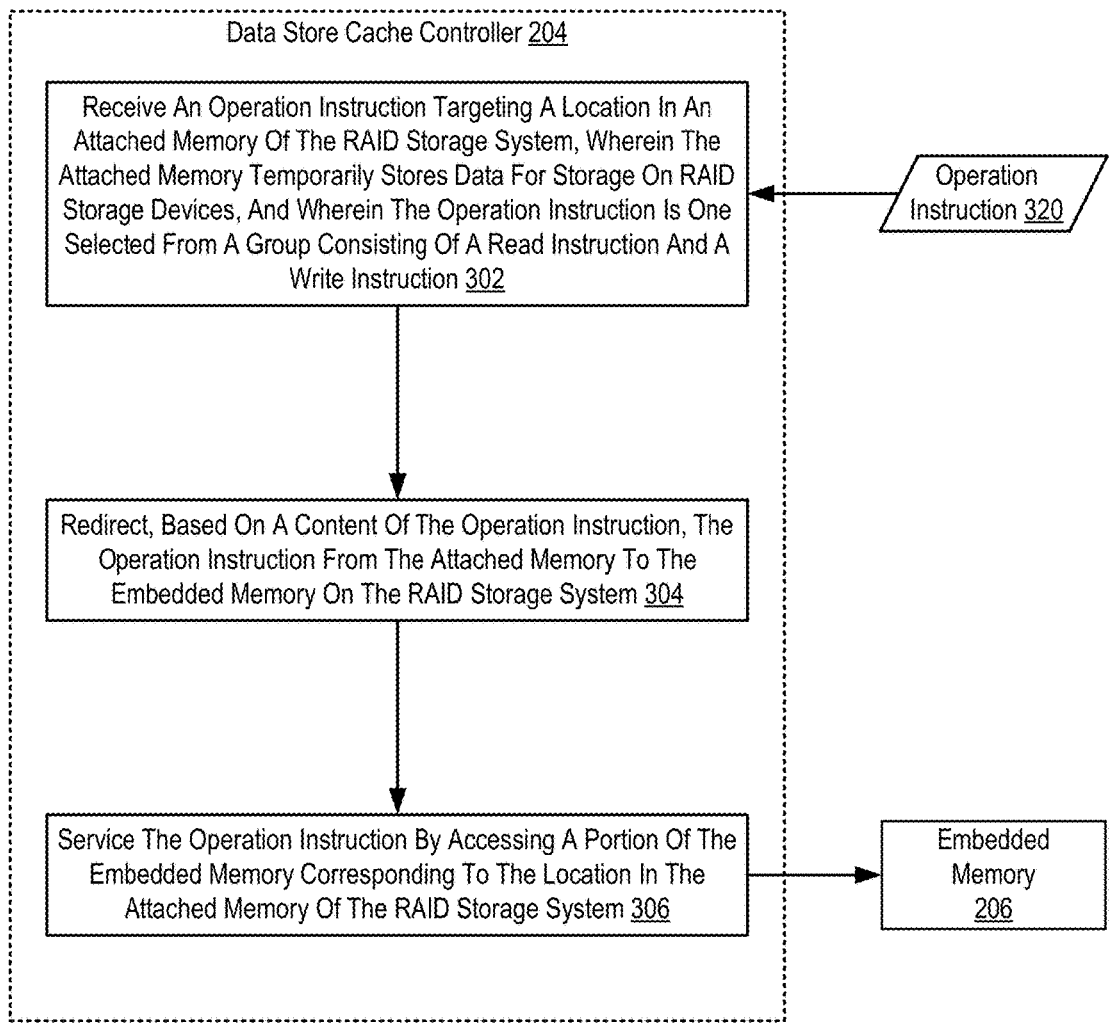
FIG. 3 sets forth a flow chart illustrating an exemplary method for caching data in a RAID storage system according to embodiments of the present invention.

For further explanation, FIG. 3 sets forth a flow chart illustrating an exemplary method for caching data in a RAID storage system according to embodiments of the present invention. The method of FIG. 3 includes receiving (302) an operation instruction (320) targeting a location in an attached memory of the RAID storage system, wherein the attached memory temporarily stores data for storage on RAID storage devices, and wherein the operation instruction (320) is one selected from a group consisting of a read instruction and a write instruction. Receiving (302) an operation instruction (320) targeting a location in an attached memory of the RAID storage system, wherein the attached memory temporarily stores data for storage on RAID storage devices, and wherein the operation instruction (320) is one selected from a group consisting of a read instruction and a write instruction may be carried out by the data store cache controller (204) receiving a read operation instruction attempting to read data at an address in the attached memory, or a write operation instruction attempting to write data to an address in the attached memory.

The operation instruction is an instruction issued and serviced within the RAID storage system, the attached memory, and the RAID storage devices. The operation instruction is distinct from the write and read instructions received from the host attached to the RAID storage system. Specifically, the operation instructions are instructions used to write data from a volatile buffer in the attached memory or embedded memory to the RAID storage devices. The operation instructions are also used to read data from the volatile buffers. The operation instructions are also used to write calculated parities from the volatile buffers to the RAID storage devices.

For example, in a RAID 5 system, data received from the host for writing to the RAID storage devices is first placed in a nonvolatile cache buffer. The data is then decompressed and stored in a first volatile buffer. The data from the first volatile buffer is then read and XORed with the existing data from the RAID storage devices. The XORed result is then stored in a second volatile buffer, and the data in the first volatile buffer is written to the RAID storage devices. The existing parity is then read from the RAID storage devices and XORed with the XORed result previously stored in the second volatile buffer to obtain the updated parity. The updated parity is written to the first volatile buffer before being written to the RAID storage devices. Each of these read and write instructions targeting the volatile buffers is an operation instruction.

The method of FIG. 3 also includes redirecting (304), based on a content of the operation instruction, the operation instruction from the attached memory to the embedded memory (206) on the RAID storage system. Redirecting (304), based on a content of the operation instruction, the operation instruction from the attached memory to the embedded memory (206) on the RAID storage system may be carried out by examining the operation instruction and determining the location targeted by the operation instruction. The content of the operation instruction refers to the type of operation instruction and address targeted by the read operation or write operation. For example, the content of the operation instruction may include a read operation, a write operation, the type of targeted address, the validity of the targeted address, and the location of the address (e.g., within or outside of a range of addresses).

Redirecting (304), based on a content of the operation instruction, the operation instruction from the attached memory to the embedded memory (206) on the RAID storage system may be carried out by determining that the location targeted by the operation instruction is a valid address and is within a range of address to be redirected. Redirecting (304), based on a content of the operation instruction, the operation instruction from the attached memory to the embedded memory (206) on the RAID storage system may also be carried out by determining a location in the embedded memory (206) that corresponds to the location in the attached memory. Determining the location in the embedded memory (206) that corresponds to the location in the attached memory may include comparing the targeted location in the operation instruction to addresses stored in the embedded memory (206) to determine if a corresponding cacheline is stored in the embedded memory (206).

The method of FIG. 3 also includes servicing (306) the operation instruction by accessing a portion of the embedded memory (206) corresponding to the location in the attached memory of the RAID storage system. Servicing (306) the operation instruction by accessing a portion of the embedded memory (206) corresponding to the location in the attached memory of the RAID storage system may be carried out by reading the data stored at the location in the embedded memory or writing to the location in the embedded memory.

For example, a write operation instruction may be issued to the data store cache controller (204) to write decompressed data from the nonvolatile data buffer to a first volatile data buffer. The write operation instruction may target an address in the attached DRAM. The data store cache controller (204) receives the write operation instruction and determines, based on the address in the DRAM targeted by the instruction, that the instruction is to be redirected to the embedded memory (206). The data store cache controller (204) then writes the data from the nonvolatile buffer to a corresponding location in the embedded memory (206) instead of a location in the attached memory.

Figure 4:
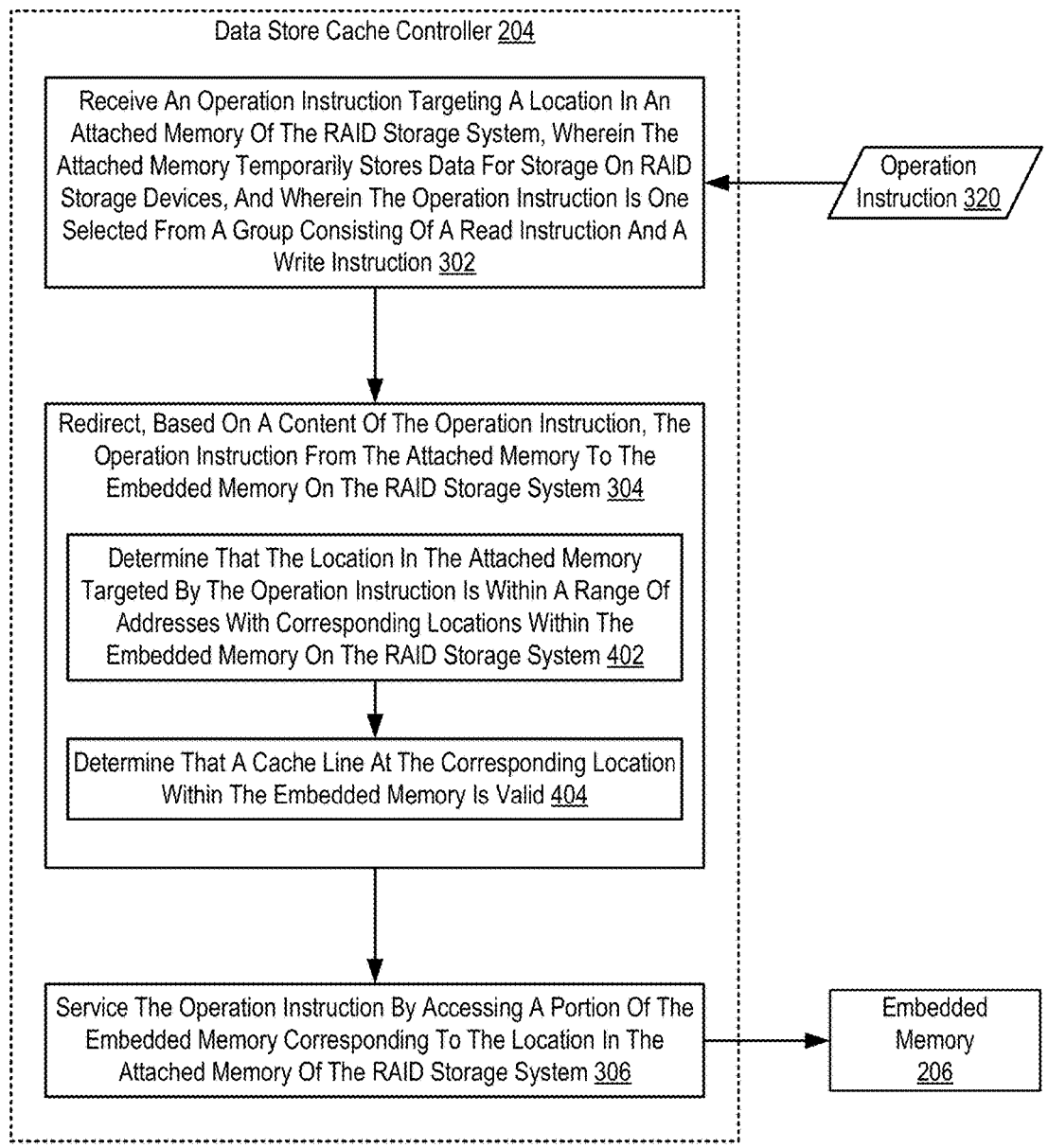
FIG. 4 sets forth a flow chart illustrating an exemplary method for caching data in a RAID storage system according to embodiments of the present invention.

For further explanation, FIG. 4 sets forth a flow chart illustrating a further exemplary method for caching data in a RAID storage system according to embodiments of the present invention that includes receiving (302) an operation instruction (320) targeting a location in an attached memory of the RAID storage system, wherein the attached memory temporarily stores data for storage on RAID storage devices, and wherein the operation instruction (320) is one selected from a group consisting of a read instruction and a write instruction; redirecting (304), based on a content of the operation instruction, the operation instruction from the attached memory to the embedded memory (206) on the RAID storage system; and servicing (306) the operation instruction by accessing a portion of the embedded memory (206) corresponding to the location in the attached memory of the RAID storage system.

The method of FIG. 4 differs from the method of FIG. 3, however, in that redirecting (304), based on a content of the operation instruction, the operation instruction from the attached memory to the embedded memory (206) on the RAID storage system includes determining (402) that the location in the attached memory targeted by the operation instruction is within a range of addresses with corresponding locations within the embedded memory on the RAID storage system; and determining (404) that a cache line at the corresponding location within the embedded memory is valid.

Determining (402) that the location in the attached memory targeted by the operation instruction is within a range of addresses with corresponding locations within the embedded memory on the RAID storage system may be carried out by retrieving a range of memory addresses that are to be redirected to the embedded memory and comparing the list of addresses to the targeted address in the received operation instruction.

Determining (404) that a cache line at the corresponding location within the embedded memory is valid may be carried out by reading a valid bit for the cacheline at the corresponding location within the embedded memory. The valid bit may be a single binary element indicating whether the cacheline at that location is coherent with the data stored in the attached memory. The data store cache controller (204) may also determine that the subblock in the embedded memory is also valid.

For a write operation instruction, if the targeted address is within a range of addresses with corresponding locations within the embedded memory, but the corresponding cacheline in the embedded memory is not valid, then the data store cache controller (204) may determine whether there is an empty cacheline in the embedded memory, and if so, the data store cache controller (204) will mark the empty cacheline active and store the source data at the activated cacheline within the embedded memory.

Figure 5:
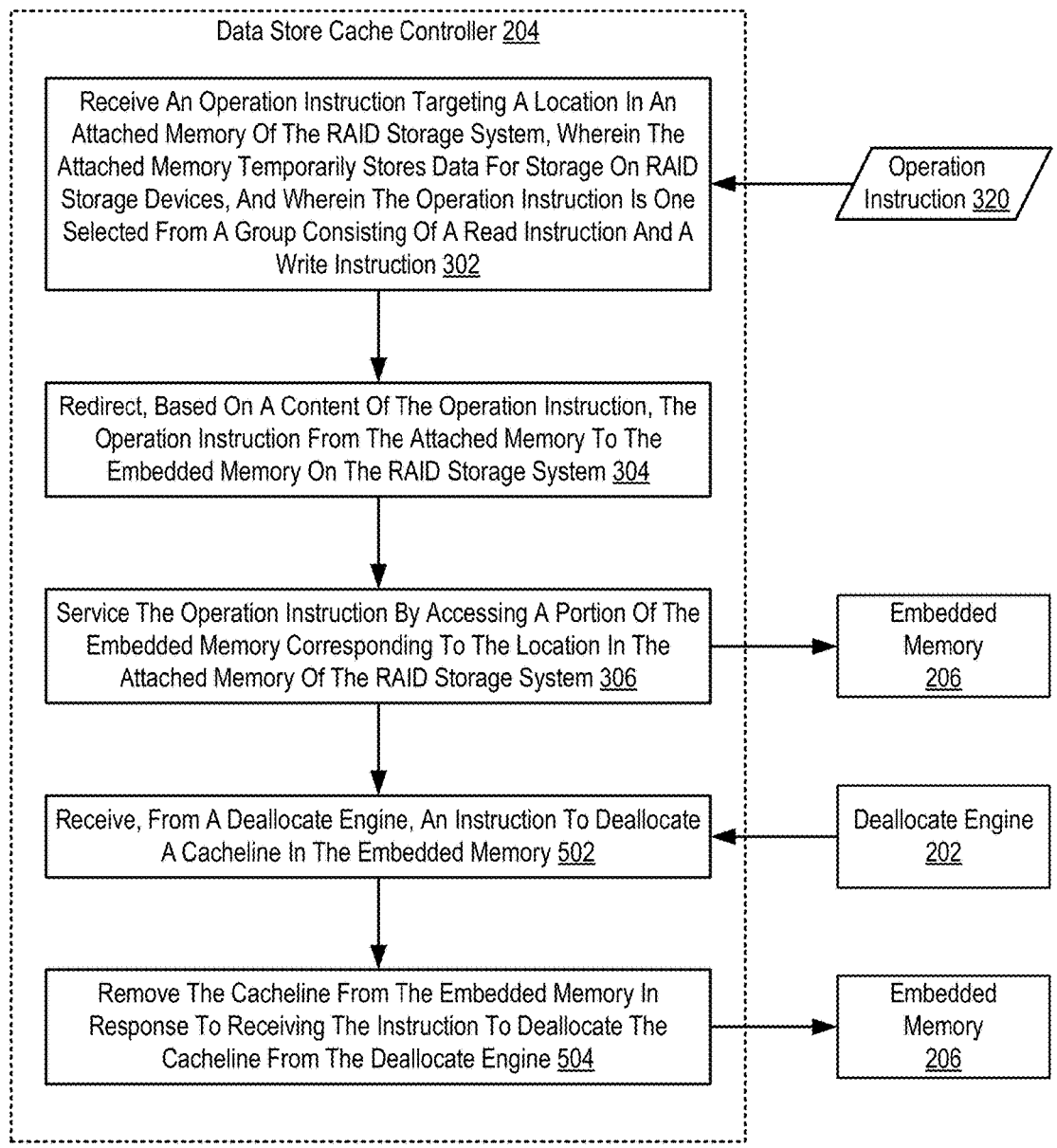
FIG. 5 sets forth a flow chart illustrating an exemplary method for caching data in a RAID storage system according to embodiments of the present invention.

For further explanation, FIG. 5 sets forth a flow chart illustrating a further exemplary method for caching data in a RAID storage system according to embodiments of the present invention that includes receiving (302) an operation instruction (320) targeting a location in an attached memory of the RAID storage system, wherein the attached memory temporarily stores data for storage on RAID storage devices, and wherein the operation instruction (320) is one selected from a group consisting of a read instruction and a write instruction; redirecting (304), based on a content of the operation instruction, the operation instruction from the attached memory to the embedded memory (206) on the RAID storage system; and servicing (306) the operation instruction by accessing a portion of the embedded memory (206) corresponding to the location in the attached memory of the RAID storage system.

The method of FIG. 5 differs from the method of FIG. 3, however, in that FIG. 5 further includes receiving (502), from a deallocate engine (202), an instruction to deallocate a cacheline in the embedded memory (206); and removing (504) the cacheline from the embedded memory (206) in response to receiving the instruction to deallocate the cacheline from the deallocate engine (202).

Receiving (502), from a deallocate engine (202), an instruction to deallocate a cacheline in the embedded memory (206) may be carried out by the deallocate engine (202) receiving a notification that the data and all corresponding parities have been written to the RAID storage devices and the data stored in the volatile buffers for that RAID write operation are no longer needed. In response, the deallocate engine (202) may issue the deallocate instruction to clear the data from the embedded memory.

Removing (504) the cacheline from the embedded memory (206) in response to receiving the instruction to deallocate the cacheline from the deallocate engine (202) may be carried out by the data cache controller (126) locating the cacheline in the embedded memory and setting a valid bit for the cacheline to indicate that the cacheline is no longer valid. The data cache controller (126) may also remove references to the corresponding address in the embedded memory (206) to indicate that the cacheline for the attached memory is not stored in the embedded memory (206). Removing (504) the cacheline from the embedded memory (206) refers to deleting the cacheline from the embedded memory (206) and may not include casting out the cacheline or copying the content of the cacheline into other memory.

Figure 6:
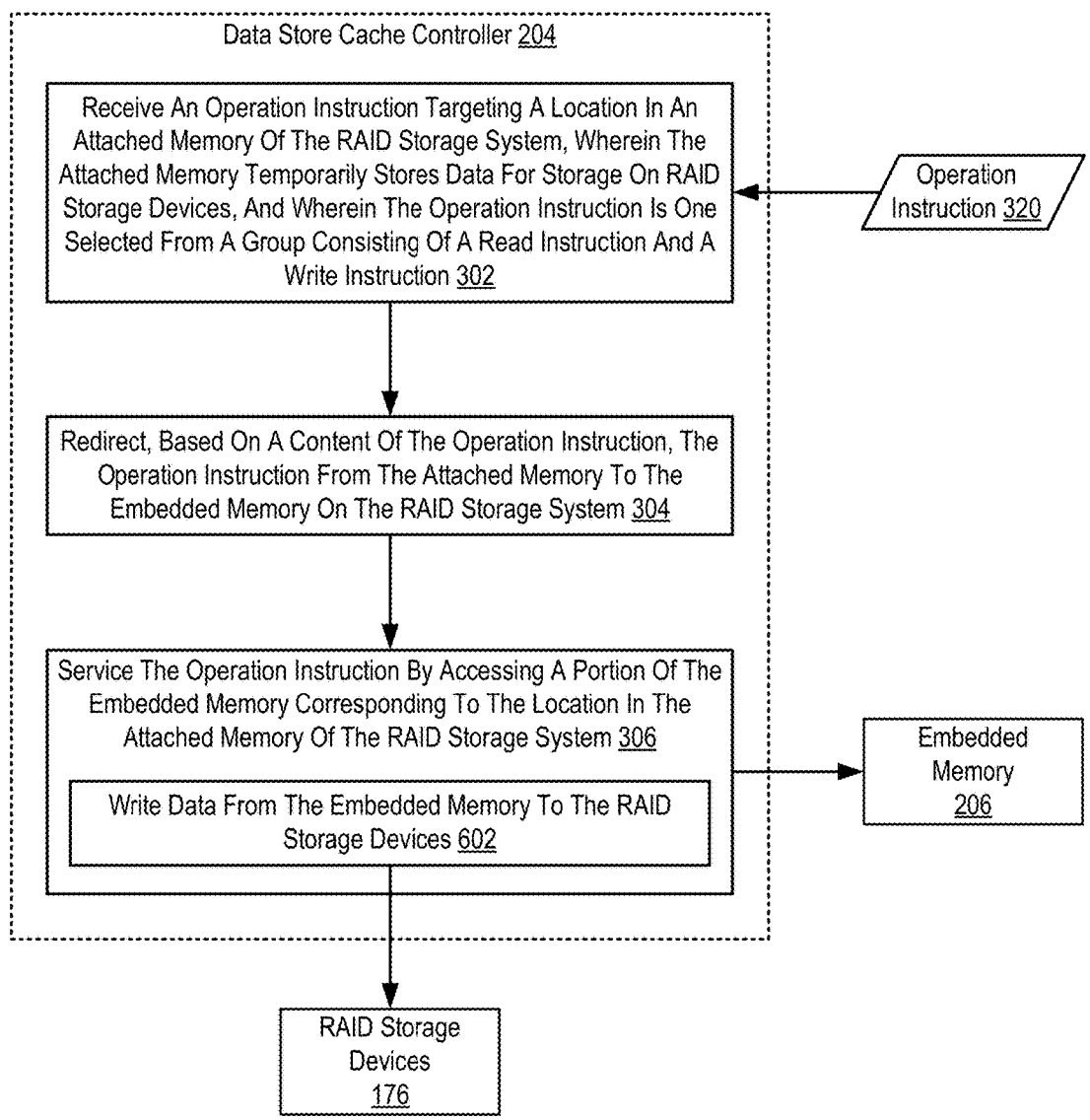
FIG. 6 sets forth a flow chart illustrating an exemplary method for caching data in a RAID storage system according to embodiments of the present invention.

For further explanation, FIG. 6 sets forth a flow chart illustrating a further exemplary method for caching data in a RAID storage system according to embodiments of the present invention that includes receiving (302) an operation instruction (320) targeting a location in an attached memory of the RAID storage system, wherein the attached memory temporarily stores data for storage on RAID storage devices, and wherein the operation instruction (320) is one selected from a group consisting of a read instruction and a write instruction; redirecting (304), based on a content of the operation instruction, the operation instruction from the attached memory to the embedded memory (206) on the RAID storage system; and servicing (306) the operation instruction by accessing a portion of the embedded memory (206) corresponding to the location in the attached memory of the RAID storage system.

The method of FIG. 6 differs from the method of FIG. 3, however, in that servicing (306) the operation instruction by accessing a portion of the embedded memory (206) corresponding to the location in the attached memory of the RAID storage system includes writing (602) data from the embedded memory (206) to the RAID storage devices (176). Writing (602) data from the embedded memory (206) to the RAID storage devices (176) may be carried out by the data cache controller (126) accessing the data stored at the location in the embedded memory corresponding to the address in the received write operation instruction, and writing the data to a RAID stripe in the RAID storage devices (176).

In view of the explanations set forth above, readers will recognize that the benefits of caching data in a RAID storage system according to embodiments of the present invention include:
  Improving the operation of a computer system by utilizing faster embedded memory on a storage system to write RAID stripe data and parity data, increasing computer system efficiency.
  Improving the operation of a computer system by externally managing embedded memory to service operation instructions for writing RAID stripe data and parity data, increasing computer system efficiency.

Exemplary embodiments of the present invention are described largely in the context of a fully functional computer system for caching data in a redundant array of independent disks (RAID) storage system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for caching data in a redundant array of independent disks (RAID) storage system, the apparatus configured to carry out the steps of:
   receiving an operation instruction targeting a location in an attached memory of the RAID storage system, wherein the attached memory temporarily stores data for storage on RAID storage devices, and wherein the operation instruction is one selected from a group consisting of a read instruction and a write instruction;
   redirecting, based on a content of the operation instruction, the operation instruction from the attached memory to embedded memory on the RAID storage system; and
   servicing the operation instruction by accessing a portion of the embedded memory corresponding to the location in the attached memory of the RAID storage system, wherein the embedded memory does not cast to or load from the attached memory and is populated by redirected write instructions instead of load operations.

2. The apparatus of claim 1, wherein redirecting, based on the content of the operation instruction, the operation instruction from the attached memory to the embedded memory on the RAID storage system comprises:
   determining that the location in the attached memory targeted by the operation instruction is within a range of addresses with corresponding locations within the embedded memory on the RAID storage system.

3. The apparatus of claim 2, wherein redirecting, based on the content of the operation instruction, the operation instruction from the attached memory to the embedded memory on the RAID storage system further comprises:
   determining that a cache line at the corresponding location within the embedded memory is valid.

4. The apparatus of claim 1, further configured to carry out the steps of:
   receiving, from a deallocate engine, an instruction to deallocate a cacheline in the embedded memory; and
   removing the cacheline from the embedded memory in response to receiving the instruction to deallocate the cacheline from the deallocate engine.

5. The apparatus of claim 1, wherein servicing the operation instruction by accessing the portion of the embedded memory corresponding to the location in the attached memory of the RAID storage system comprises:
   writing data from the embedded memory to the RAID storage devices.

6. The apparatus of claim 1, wherein the RAID storage system is on an application specific integrated circuit, and wherein the embedded memory is embedded in the application specific integrated circuit.

7. The apparatus of claim 1, wherein the attached storage comprises a dynamic random access memory chip attached to an application specific integrated circuit comprising the embedded memory.

8. A computer program product for caching data in a redundant array of independent disks (RAID) storage system, the computer program product disposed upon a computer readable medium, the computer program product comprising computer program instructions that, when executed, cause a RAID storage system to carry out the steps of:
   receiving an operation instruction targeting a location in an attached memory of the RAID storage system, wherein the attached memory temporarily stores data for storage on RAID storage devices, and wherein the operation instruction is one selected from a group consisting of a read instruction and a write instruction;
   redirecting, based on a content of the operation instruction, the operation instruction from the attached memory to embedded memory on the RAID storage system; and
   servicing the operation instruction by accessing a portion of the embedded memory corresponding to the location in the attached memory of the RAID storage system, wherein the embedded memory does not cast to or load from the attached memory and is populated by redirected write instructions instead of load operations.

9. The computer program product of claim 8, wherein redirecting, based on the content of the operation instruction, the operation instruction from the attached memory to the embedded memory on the RAID storage system comprises:
   determining that the location in the attached memory targeted by the operation instruction is within a range of addresses with corresponding locations within the embedded memory on the RAID storage system.

10. The computer program product of claim 9, wherein redirecting, based on the content of the operation instruction, the operation instruction from the attached memory to the embedded memory on the RAID storage system further comprises:
    determining that a cache line at the corresponding location within the embedded memory is valid.

11. The computer program product of claim 8, the computer program instructions that, when executed, further cause the RAID storage system to carry out the steps of:
    receiving, from a deallocate engine, an instruction to deallocate a cacheline in the embedded memory; and
    removing the cacheline from the embedded memory in response to receiving the instruction to deallocate the cacheline from the deallocate engine.

12. The computer program product of claim 8, wherein servicing the operation instruction by accessing the portion of the embedded memory corresponding to the location in the attached memory of the RAID storage system comprises:
    writing data from the embedded memory to the RAID storage devices.

13. The computer program product of claim 8, wherein the RAID storage system is on an application specific integrated circuit, and wherein the embedded memory is embedded in the application specific integrated circuit.

* * * * *